Figure 1:
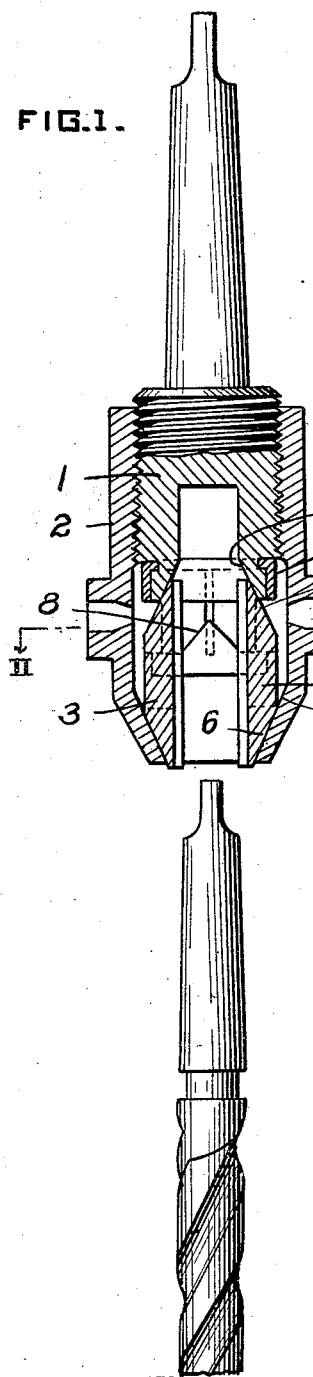
Figure 2:
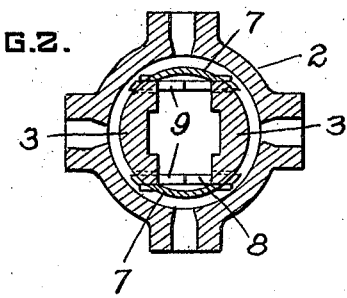
Figures 3, 5:
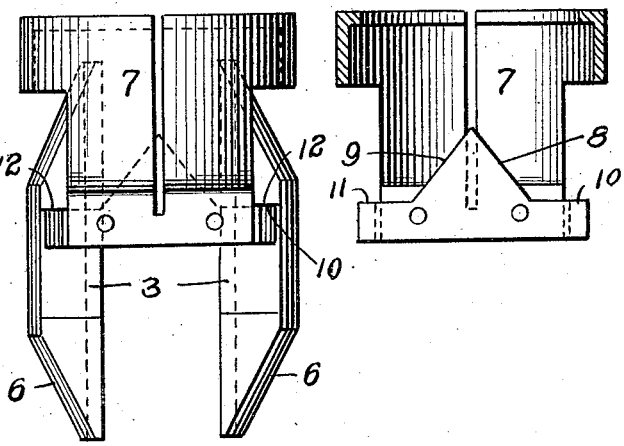
Figure 4:
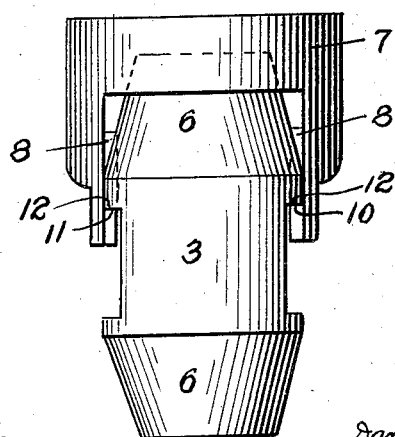

D. C. ROBINSON.
CHUCK FOR TOOL OPERATING MACHINES.
APPLICATION FILED JULY 13, 1921.

1,415,119.

Patented May 9, 1922.

WITNESSES
J. Herbert Bradley.
Francis J. Tomasson

INVENTOR
Daniel C. Robinson
by Christy and Christy
his attorneys

UNITED STATES PATENT OFFICE.

DANIEL C. ROBINSON, OF MONESSEN, PENNSYLVANIA, ASSIGNOR OF ONE-HALF TO WILLIAM C. JOHNSON, OF RICES LANDING, PENNSYLVANIA.

CHUCK FOR TOOL-OPERATING MACHINES.

1,415,119. Specification of Letters Patent. Patented May 9, 1922.

Application filed July 13, 1921. Serial No. 484,291.

*To all whom it may concern:*

Be it known that I, DANIEL C. ROBINSON, residing at Monessen, in the county of Westmoreland and State of Pennsylvania, a citizen of the United States, have invented or discovered certain new and useful Improvements in Chucks for Tool-Operating Machines, of which improvements the following is a specification.

My invention relates to improvements in chucks for tool-operating machines. The parts are few and simple and readily assembled, and when the chuck stands idle and in vertical position, which is its normal position, the jaws of the chuck stand open, ready to receive the shank of a tool; when a tool is introduced, and the jaws closed, they come surely and firmly to position, engaging the shank of the tool.

In the accompanying drawings a chuck embodying my invention is illustrated: Fig. I is a vertical medial section of the chuck, the parts being in inactive and open position, while beneath is shown in elevation the shank end of a tool, ready to be introduced into the chuck; Fig. II is a view in horizontal section, on the plane indicated by the line II—II, Fig. I; Fig. III is a view in elevation and to larger scale of the stirrup and the jaws of the chuck, dissected from the other members, the jaws standing in open position; Fig. IV shows in elevation the same assembly as Fig. III, but from a point of view 90° removed; Fig. V is a view in vertical and medial section of the stirrup member alone, the view is that of Fig. I and the scale that of Fig. III.

The chuck includes a stock 1 and a follower 2, the latter screw-threaded upon the former, and a pair of tool-engaging jaws 3 secured between. Stock 1 is provided with a central recess with beveled walls 4, follower 2 is provided with internal beveled walls 5, and jaws 3 are provided with cooperating beveled surfaces 6, to the end that, when the jaws are in place within the chuck head and the follower is tightened, the jaws will be driven by wedging action exerted through the beveled surfaces designated to tool-clamping position. The structure as thus far indicated is known to the art, and it is to that known and serviceable co-ordination and assembly that my invention is superadded. It should, however, be said that the invention is conceivably applicable to any chuck having jaws, and in which it is desirable to have the jaws when inactive stand apart and in tool-receiving position. I do not mean to limit myself to a chuck closed by wedging action, but I illustrate it applied to such a chuck, for that is a serviceable application of it.

Upon the end of stock 1, and extending from it into the space enclosed by follower 2, is a stirrup 7. The minute structure of this member will be understood on comparing the various illustrations of it afforded in Figs. II–V. Its essential features are that it shall be rigid upon stock 1, that it shall afford pairs of inclined surfaces 8, 8 and 9, 9, upon which suitably shaped jaws 3, 3 may slide downward and outward when free to respond to gravity, and upon which in turn they may be advanced upward and inward by follower 2, when the latter is advanced by turning upon stock 1. These inclined surfaces 8, 8 and 9, 9 are preferably continued in the horizontal surfaces 10, 10 and 11, 11. Furthermore, as most clearly appears in Fig. IV, these surfaces, 8, 9, 10, 11 are so disposed that they afford a diminution in the width of the stirrup at its lower or outer end.

Co-operating with stirrup 7 and the surfaces specified, the clamping jaws 3 are shaped, as best shown in Fig. IV, with narrow body portions and enlarged ends; the widths of stirrup and jaws are so proportioned, that the jaws may be thrust into the stirrup above, where the stirrup is wider, and then rest, by shoulders 12, upon the surfaces 8, 9, 10, 11.

In assembly, a pair of jaws is introduced into the stirrup 7 of the stock of the chuck, and rest upon shoulders 10, 10, 11, 11. I say a pair of jaws, because the chuck shown is provided with two; obviously the invention is not limited to nor conditioned by any particular number of jaws. The jaws come to rest, with shoulders 12 bearing upon surfaces 10, 10, 11, 11, for ordinarily the structure will stand in the vertical position indicated in Fig. I. The follower 2 is then applied, and the chuck is closed in usual manner upon the shank of an introduced tool.

When a tool is to be released, the follower 2 is unscrewed in the usual manner, and as the follower recedes from stock 1, the jaws 3, descending upon the inclined surfaces 8, 8, 9, 9 will open, and stand normally open, ready to receive another tool.

Thus the jaws are always, when the chuck is open, standing ready for the introduction of the tool; the feature makes for ease and speed in applying a tool.

The jaws of course are replaceable and pairs of jaws of different thickness may be provided, to adapt the chuck to carry tools with shanks of different size.

The invention is primarily intended for machinery such as drill-presses and boring-machines, in which the chucks are carried in parts which move only in certain predetermined paths—ordinarily vertical. But as has already been intimated the invention is applicable, regardless of such limiting condition; for, even in a hand driven mechanism, it is manifestly advantageous that the jaws shall open and stand apart when the mechanism is brought to a certain position; ready to receive a tool. Ordinarily, in case of a chuck having jaws which are driven to clamping engagement with a tool by wedging action, such as the drawings show, the same wedging arrangement (of surfaces 5 and 6) which effects clamping, is effective, when the chuck is idle and stands in the usual vertical position, to cause the jaws to close; with my invention superadded, the jaws at such time stand normally open, ready to receive a tool.

I have intimated that the invention is applicable to chucks generally, and that the provision whereby the jaws open and stand open, wherein the invention consists, is not conditioned on the particular way of closing the jaws, by the wedging action shown.

I claim as my invention:

1. A clutch for a tool including a stock adapted to stand in vertical position and provided interiorly with an upwardly tapered seat for clamping jaws, said stock being further provided with a stirrup extending downwardly beyond the said seat, the lower ends of the stirrup being built out on their inner sides, and there provided with opposite pairs of inclined surfaces, a plurality of clamping jaws, consisting each of a narrowed body portion and a widened end portion, the end portion of the jaw adapted to be seated in the aforesaid seat in the stock and the jaw adapted to rest by shoulders formed where its body and end portions meet upon a pair of the said opposite inclined surfaces of the stirrup, and a follower adjustable upon said stock and by adjustment adapted to effect clamping movement of a plurality of jaws assembled between stock and follower.

2. A chuck for a tool including a stock, a plurality of clamping jaws, and means for closing said jaws upon a tool, together with a stirrup borne by said stock and provided with jaw-sustaining surfaces, said surfaces extending obliquely to the axis of the structure throughout part of their extent, and perpendicularly to that axis throughout the rest of their extent, and said jaws being provided with shoulders engaging said surfaces, substantially as described.

In testimony whereof I have hereunto set my hand.

DANIEL C. ROBINSON.

Witnesses:
FRANCIS J. TOMASSON,
HARRY VANDERSYDE.